United States Patent
Shim

(10) Patent No.: US 7,381,151 B2
(45) Date of Patent: Jun. 3, 2008

(54) UPSHIFT CONTROL SYSTEM OF AUTOMATIC TRANSMISSION AND METHOD THEREOF

(75) Inventor: Hyun Soo Shim, Gwangmyeong (KR)

(73) Assignee: Hyundai Motor Company, Seoul (KR)

( * ) Notice: Subject to any disclaimer, the term of this patent is extended or adjusted under 35 U.S.C. 154(b) by 602 days.

(21) Appl. No.: 11/001,585

(22) Filed: Dec. 1, 2004

(65) Prior Publication Data

US 2005/0125130 A1    Jun. 9, 2005

(30) Foreign Application Priority Data

Dec. 5, 2003    (KR)    ............... 10-2003-0088011

(51) Int. Cl.
    *F16H 61/04*    (2006.01)
    *F16H 61/00*    (2006.01)
(52) U.S. Cl. ............... 477/154; 477/117; 477/904
(58) Field of Classification Search .......... 477/904, 477/143, 154, 116, 117, 120; 701/55, 56
    See application file for complete search history.

(56) References Cited

U.S. PATENT DOCUMENTS

| 5,046,383 | A |   | 9/1991  | Butts et al. |  |
|---|---|---|---|---|---|
| 5,967,942 | A | * | 10/1999 | Yuasa et al. | 477/156 |
| 6,186,923 | B1 | * | 2/2001 | Popp et al. | 477/115 |
| 6,319,172 | B1 |   | 11/2001 | Steinmetz et al. |  |
| 6,450,920 | B1 | * | 9/2002 | Yu | 477/154 |
| 6,503,165 | B1 | * | 1/2003 | Kubo et al. | 475/125 |
| 6,616,576 | B2 | * | 9/2003 | Saito | 477/154 |
| 2004/0116250 | A1 | * | 6/2004 | Whitton | 477/143 |

FOREIGN PATENT DOCUMENTS

JP    07-269691    10/1995

* cited by examiner

*Primary Examiner*—Roger Pang
(74) *Attorney, Agent, or Firm*—Morgan Lewis & Bockius LLP

(57) ABSTRACT

A power-on 2-3 upshift control method for an automatic transmission comprises: determining whether a power-on 2-3 upshift condition exists; extracting an initial hydraulic pressure control duty and hydraulic pressure control duty depending on an input torque from a map table for an on-coming friction element and an off-going friction element, if it is determined that the power-on 2-3 upshift condition exists, and performing a shift control for the upshift; and completely releasing a hydraulic pressure of the off-going friction element at a point at which a hydraulic pressure for the on-coming friction element is capable of tolerating a turbine torque.

8 Claims, 5 Drawing Sheets

UPSHIFT CONTROL SYSTEM OF AUTOMATIC TRANSMISSION AND METHOD THEREOF

CROSS REFERENCE TO RELATED APPLICATIONS

This application claims priority of Korean Application No. 10-2003-0088011, filed on Dec. 5, 2003, the disclosure of which is incorporated herein by reference.

TECHNICAL FIELD OF THE INVENTION

The present invention relates to an automatic transmission, and more particularly, to an upshift control system and method for a power-on 2-3 upshift.

BACKGROUND OF THE INVENTION

Recent automatic transmissions often comply a clutch-to-clutch shifting system, i.e., an independent shifting system in which hydraulic control for an off-going clutch is not performed during an upshift or a downshift, and only release timing of the off-going clutch is controlled. Therefore, for the off-going clutch, after the release timing, the hydraulic pressure is released from the off-going friction element without additional control.

In such a hydraulic control scheme, the timing of release of the hydraulic pressure from the off-going friction element is determined as a point at which a hydraulic pressure for an on-coming friction element rises suitably. When the hydraulic pressure is released too quickly from the off-going friction element or when the hydraulic pressure is supplied too slowly to the on-coming friction element, a flare may occur such that shift quality may deteriorate.

Although an additional shift control scheme (e.g., a bang-bang control) can be used in order to solve such a problem, the shift feel may be deteriorated by torque changes due to the rapid increase of hydraulic pressure.

In particular, during a power-on 2-3 upshift, a flare phenomenon, in which turbine rpm abnormally increases according to hydraulic pressure states, may occur. Such phenomenon of a rapid increase of turbine rpm is caused by a release of hydraulic pressure from an off-going clutch in a state in which hydraulic pressure of an on-coming clutch does not sufficiently sustain an input torque (i.e., turbine torque).

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide a shift control system and a method thereof for a power-on 2-3 upshift by controlling hydraulic pressure control duty of an off-going friction element according to an input torque and then completely releasing the hydraulic pressure from an off-going friction element at a point at which a current turbine rpm becomes lower than a second-speed synchronous turbine rpm by a predetermined value to achieve a reliable shift control.

An exemplary shift control system of an automatic transmission according to an embodiment of the present invention includes at least one sensor, which may one or more of a transmission output shaft rpm sensor detecting a transmission output shaft rpm, a throttle opening angle sensor detecting a throttle opening angle, an engine rpm sensor detecting an engine rpm, or a turbine rpm detection sensor detecting a turbine rpm. A hydraulic pressure control actuator controls hydraulic pressure of friction elements of the automatic transmission, and a transmission control unit controls the hydraulic pressure control actuator to perform a gear shifting on the basis of signals from the at least one sensor. The transmission control unit performs a duty control for controlling hydraulic pressures for at least one on-coming friction element and at least one off-going friction element during a power-on 2-3 upshift, such that hydraulic pressures for the on-coming friction element and the off-going friction element are simultaneously controlled based on a turbine torque.

In a further embodiment of the present invention, the transmission control unit controls a hydraulic pressure control duty of the off-going friction element, and outputs the hydraulic pressure control duty of the off-going friction element as 0% at a point when a current turbine rpm is lower than a second gear synchronous turbine speed by a predetermined value, and at the same time gradually increases the hydraulic pressure control duty of the on-coming friction element to 100%.

In another further embodiment of the present invention, the transmission control unit simultaneously controls the hydraulic pressure control duty of the off-going friction element and the on-coming friction element, respectively, using maps having hydraulic pressure duty values determined with respect to turbine torques.

An exemplary power-on 2-3 upshift control method for an automatic transmission according to an embodiment of the present invention comprises: determining whether a power-on 2-3 upshift condition exists; extracting an initial hydraulic pressure control duty and hydraulic pressure control duty depending on an input torque from a map table for an on-coming friction element and an off-going friction element, if it is determined that the power-on 2-3 upshift condition exists, and performing a shift control for the upshift; and completely releasing a hydraulic pressure of the off-going friction element at a point at which a hydraulic pressure for the on-going friction element is capable of tolerating a turbine torque.

In a further embodiment of a pressure invention, the power-on 2-3 upshift control method further comprises completing a synchronization of a third gear by gradually increasing a hydraulic pressure supplied to the on-coming friction element from a point when the hydraulic pressure for the off-going friction element is completely released.

In another further embodiment of the present invention, the hydraulic pressure for the off-going friction element is completely released at a point when a turbine rpm becomes lower than a second gear synchronous turbine speed by a predetermined rpm.

In a still further embodiment of the present invention, a hydraulic pressure control duty for the off-going friction element is controlled to be β% in a first control range where an upshift starts; is increased by β1% in a second control range; is decreased by β2% and is controlled to be decreased by a predetermined decreasing rate of β3%/sec in a third control range; and is controlled to be 0% after the third control range.

An exemplary power-on 2-3 upshift control method for an automatic transmission according to another embodiment of the present invention includes: increasing a hydraulic pressure control duty of an on-coming friction element to a duty of 100% at a point after elapsing a first predetermined time from a point of detecting that a power-on 2-3 upshift condition exists, simultaneously decreasing a hydraulic pressure control duty of an off-going friction element to a first predetermined duty, and then maintaining the duty of 100% of the on-coming friction element and the duty of the first predetermined duty of the off-going friction element for a second predetermined time; increasing the hydraulic pressure control duty of the off-going friction element to a second predetermined duty that is determined depending on a turbine torque and a transmission output shaft rpm, at a point of an end of the second predetermined time, and then maintaining the second predetermined duty of the off-going friction element for a third predetermined time; decreasing the hydraulic pressure control duty of the off-going friction element to a third predetermined duty, at a point of an end of the third predetermined time, and then decreasing the hydraulic pressure control duty of the off-going friction element by a first predetermined rate; decreasing the hydraulic pressure control duty of the on-coming friction element to a fourth predetermined duty that is determined depending on the turbine torque and the transmission output shaft rpm, at the point of the end of the second predetermined time, and then maintaining the fourth predetermined duty of the on-coming friction element for the third predetermined time and the fourth predetermined time; decreasing the hydraulic pressure control duty of the off-going friction element to 0%, at a point of an end of the fourth predetermined time, and then maintaining the hydraulic pressure control duty of the off-going friction element at 0%; and decreasing the hydraulic pressure control duty of the on-coming friction element to a fourth predetermined duty, and then gradually increasing the hydraulic pressure control duty of the on-coming friction element to 100%.

In a further embodiment of the present invention, the point of the end of the fourth predetermined time is a point when a turbine rpm becomes lower than a second gear synchronous turbine speed by a predetermined rpm.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
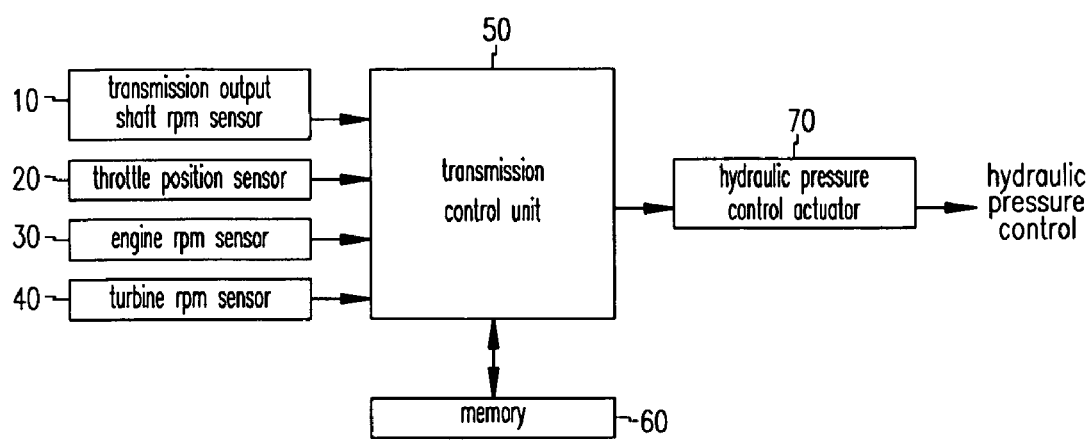
FIG. 1 is a block diagram showing a shift control system for an automatic transmission for a power-on 2-3 upshift according to an embodiment of the present invention.

A hydraulic control apparatus according to an embodiment of the present invention, as shown in FIG. 1, comprises a transmission output shaft rpm sensor 10, a throttle position sensor 20, an engine rpm sensor 30, a turbine rpm sensor 40, a transmission control unit (TCU) 50, a memory 60, and a hydraulic pressure control actuator 70. The transmission output shaft rpm sensor 10 detects an output rpm of an automatic transmission output shaft and outputs a corresponding signal. The throttle position sensor 20 detects an opening angle of a throttle valve, which is operated by a depression of an accelerator pedal, and outputs a corresponding signal. The engine rpm sensor 30 detects an engine rpm and outputs a corresponding signal. The turbine rpm sensor 40 detects a turbine rpm and outputs a corresponding signal.

Figure 3:
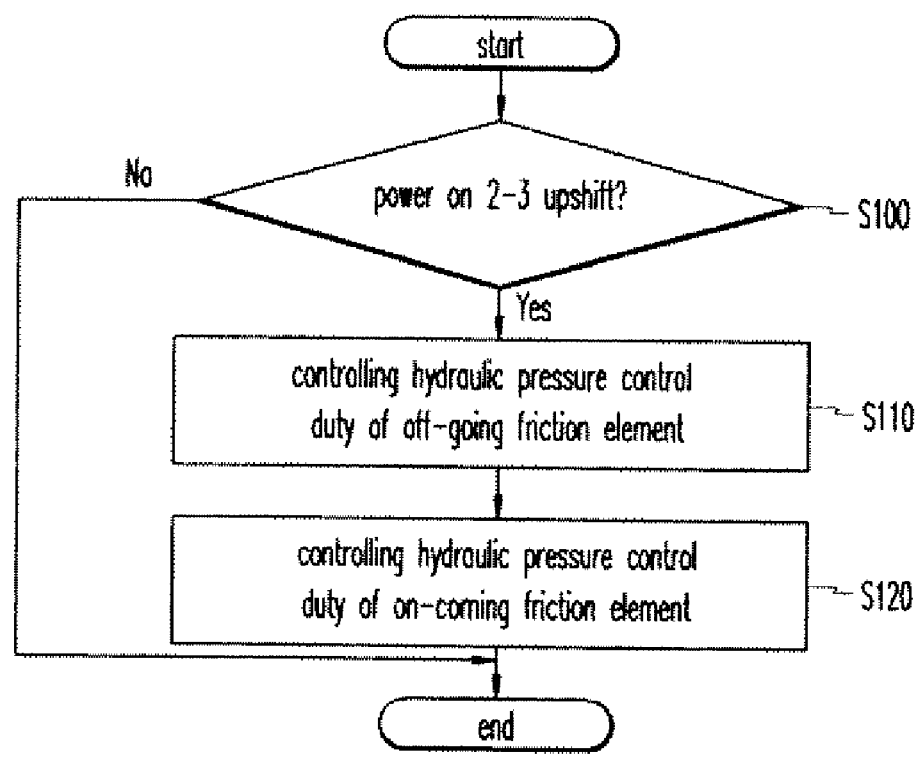
FIG. 3 is a flow chart showing a shift control method for an automatic transmission for a power-on 2-3 upshift according to an embodiment of the present invention.

The TCU 50 may include a processor, a memory, and other necessary hardware and software components as will be understood by persons skilled in the art, to permit the control unit to communicate with sensors 10, 20, 30, and 40 and execute the control function as described herein. For example, the processor may be configured to be activated by predetermined programs that can be programmed to perform each corresponding step of a method according to an embodiment of the present invention. Referring to FIG. 3, the TCU 50 determines, on the basis of signals indicating a throttle opening angle and a transmission output shaft rpm, whether a power-on 2-3 upshift condition exists at step S100. If it is determined that the power-on 2-3 upshift condition exists, the TCU 50 controls the hydraulic pressure control actuator 70 to control hydraulic pressures of an appropriate off-going friction element (e.g., clutch) and an appropriate on-coming friction element (e.g., clutch) at steps S110 and S120, such that a hydraulic pressure control duty of the off-going friction element is controlled depending on an amount of an input torque (i.e., turbine torque).

In the power-on 2-3 upshift, the TCU 50 controls a hydraulic pressure of the off-going friction element on the basis of the input torque and then releases a hydraulic pressure control signal of the off-going friction element at a point at which a hydraulic pressure of the on-coming friction element suitably rises. That is, instead of separately controlling timing controls of the off-going friction element and the on-coming friction element, the hydraulic pressure control duties of the off-going friction element and the on-coming friction element are controlled on the basis of the input torque using a predetermined map.

The memory 60 preferably stores a map table of a shift pattern depending on a vehicle speed (i.e., transmission output shaft rpm) and a throttle valve opening and a map table having hydraulic pressure control duties of the off-going friction element and the on-coming friction element.

The hydraulic pressure control actuator 70 is installed in a valve body of the transmission and operates coupling elements and friction elements through a hydraulic pressure. The hydraulic pressure control actuator 70 may include solenoid valves that operate according to duty control signals input from the transmission control unit 50.

Figure 2:
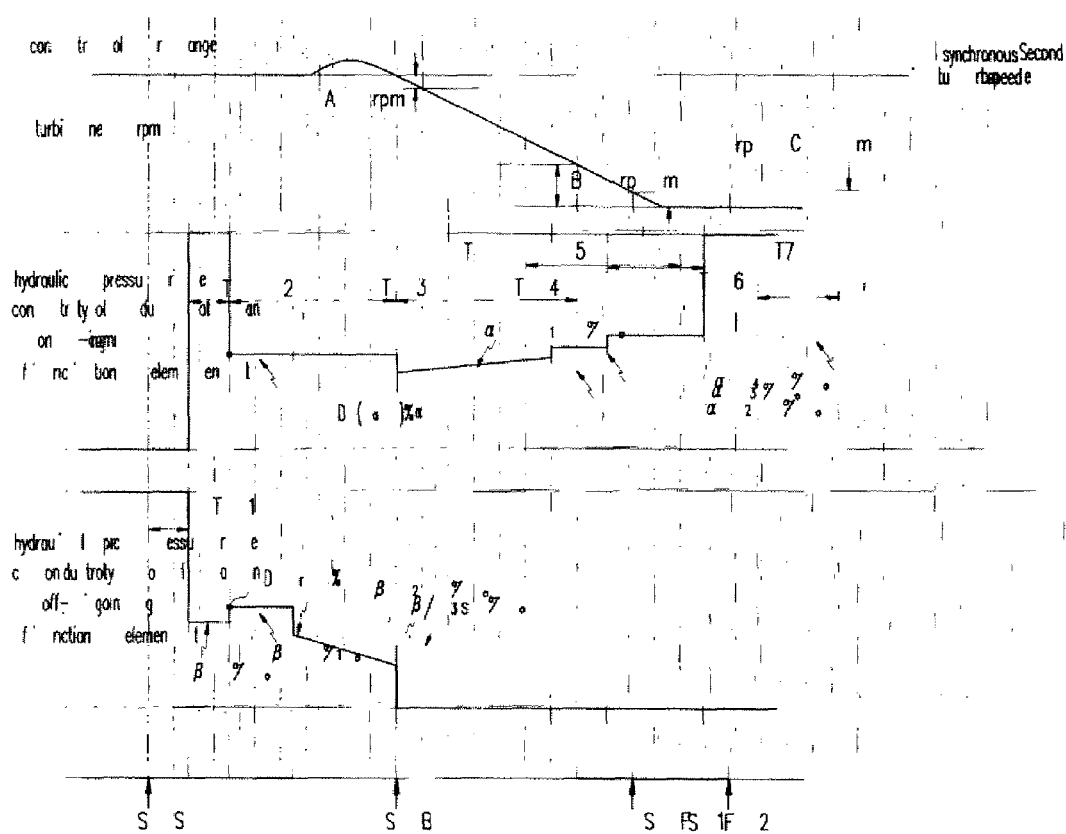
FIG. 2 illustrates duty control patterns for an on-coming friction element and an off-going friction element for a power-on 2-3 upshift according to an embodiment of the present invention.

According to a control method of an embodiment of the present invention, a duty control pattern may be obtained e.g., as shown in FIG. 2. Referring to FIGS. 2-5, a control method according to an embodiment of the present invention will be explained hereinafter.

The transmission control unit 50 receives a transmission output shaft rpm signal from the transmission output shaft rpm sensor 10 and a throttle valve opening signal from the throttle position sensor 20 TCU 50 and determines, on the basis of the transmission output shaft rpm signal and the throttle valve opening signal, whether a power-on 2-3 upshift condition exists.

If it is determined that the power-on 2-3 upshift condition exists, the transmission control unit 50 determines an initial duty of the on-coming friction element and an initial duty of the off-going friction element from a 2-dimensional map table having duties determined with respect to an input torque (i.e., a turbine torque) and a transmission output shaft rpm and performs a hydraulic pressure duty control using the initial duties.

As shown in FIG. 2, during a delay period T1 (first control range) from a point at which a shift control start condition exists, which is generally called a shift start point and abbreviated as an SS point, a hydraulic control duty of the on-coming friction element is maintained at 0% and a hydraulic control duty of the off-going friction element is maintained at 100%. In order to prevent a current shift from colliding with a previous shift, a shift control is delayed for the delay period T1 (step S210 in FIG. 4, step S310 in FIG. 5).

Figure 4:
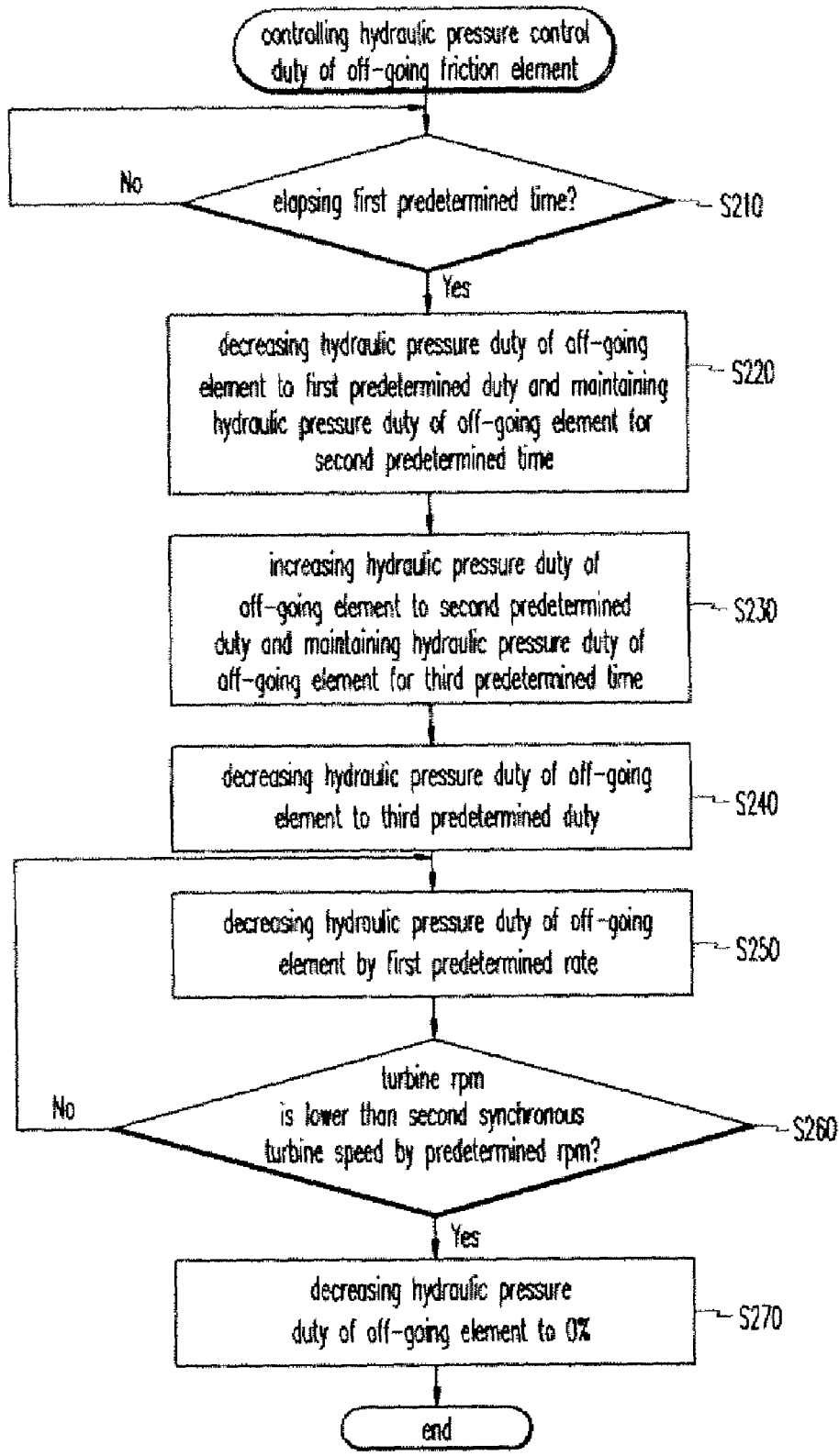
FIG. 4 is a flow chart showing a method of controlling hydraulic pressure control duty of an off-going friction element according to an embodiment of the present invention.
Figure 5:
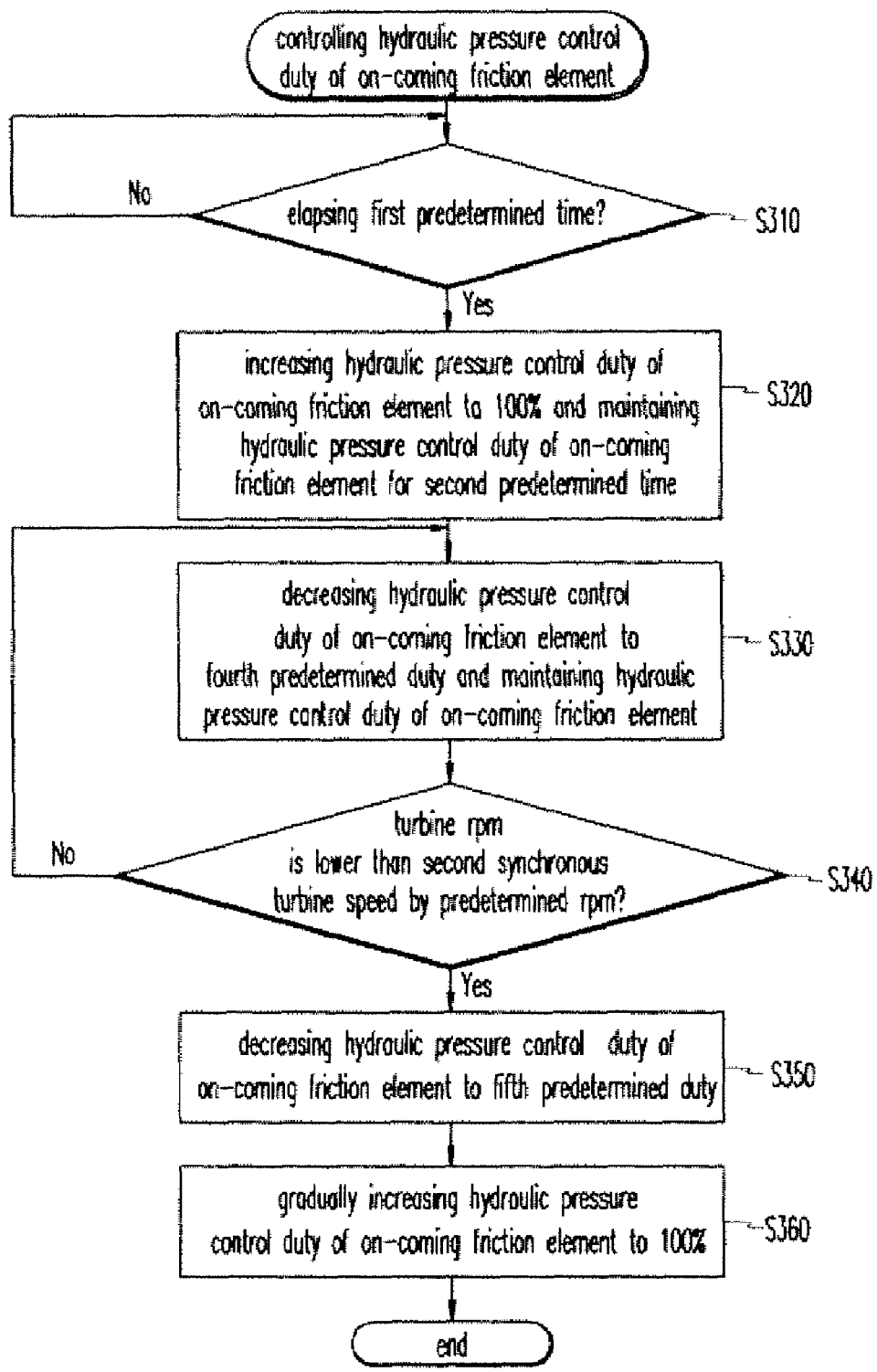
FIG. 5 is a flow chart showing a method of controlling hydraulic pressure control duty of an on-coming friction element according to an embodiment of the present invention.

After the first control range, an initial fill for the on-coming friction element is performed by outputting 100% of the hydraulic pressure control duty of the on-coming friction element and maintaining this duty for a predetermined time T2 (a second control range) (step S320 in FIG. 5). Simultaneously, after the first control range, the hydraulic pressure control duty of the off-going friction element is output as β% (preferably as 34%), and this duty is maintained for the predetermined time T2 (step S220 in FIG. 4). The predetermined time T2 for the initial fill of the on-coming friction element is preferably determined on the basis of the transmission output shaft rpm and an automatic transmission fluid (ATF) temperature, as is obvious to a person skilled in the art.

After the second control range, the hydraulic pressure control duty of the on-coming friction element is decreased to the initial duty Da, and the initial duty is maintained for a third control range (time period of T3) and a fourth control range (time period of T4), i.e., for a time period of T3+T4 (step S330 in FIG. 5). At the same time, after the second control range, the hydraulic pressure control duty of the off-going friction element is increased by β1% from the duty of β%, thereby the initial duty Dr of the off-going friction element is outputted, and the initial duty Dr is maintained for the predetermined time T3 (step S230 in FIG. 4).

Then, after the third control range, the hydraulic pressure control duty of the off-going friction element is decreased to β2% (step S240 in FIG. 4), and then is decreased by a predetermined rate β3%/sec for the predetermined time T4 (step S250 in FIG. 4).

The initial duty Da of the on-coming friction element and the initial duty Dr of the off-going friction element are preferably determined respectively on the basis of the turbine torque (i.e., input torque) and the transmission output shaft rpm, and more particularly, each initial duty Da and Dr is determined to be approximately proportional to the turbine torque and the transmission output shaft rpm. For example, the initial duty Da can be determined from a predetermined two-dimensional map having optimal initial duties with respect to the turbine torques and the transmission output shaft rpms, and similarly, the initial duty Dr can be determined from a predetermined two-dimensional map having optimal initial duties with respect to the turbine torques and the transmission output shaft rpms. The maps can be obtained from experiments.

Referring to FIG. 2, the further control range is a period from a point of an end of the third control range to a point at which a current turbine rpm becomes lower than a second-speed synchronous turbine rpm by a predetermined rpm A (for example, 30 rpm) (step S260 in FIG. 4, step S340 in FIG. 5). An end point of the fourth control range is determined as a point at which it is determined that a real shifting process has been started, and if a difference between the second-speed synchronous turbine rpm and the current turbine rpm becomes 30 rpm, it can be determined that a real shifting process has been started. The point at which it is determined that a real shifting process occurs may also be considered as a point at which the hydraulic pressure of the on-coming friction element is capable of tolerating an input torque (i.e, a turbine torque).

After the fourth control range, the hydraulic pressure control duty of the off-going friction element is decreased to 0% (step S270 in FIG. 4), and thereby the hydraulic pressure is completely released from the off-going friction element.

In addition, after the fourth control range, the hydraulic pressure control duty of the on-coming friction element is decreased by α1%(e.g., 1%) (step S350 in FIG. 5), and then is increased by a predetermined rate of α2%/sec for a predetermined time T6 (fifth control range).

After the fifth control range, the hydraulic pressure control duty of the on-coming friction element is increased by α3(e.g., 1%), and the increased duty is maintained for a predetermined time T6 (sixth control range). So, a hydraulic pressure control to a first shift finish pint SF1 is performed.

After the sixth control range, the hydraulic pressure control duty is increased by α4(e.g., 1%), and then the increased duty is maintained for a predetermined time T7 (seventh control range). So, a hydraulic pressure control to a second shift finish point SF2 is performed.

After the seventh control range, the hydraulic pressure control duty is increased to 100%, to maintain a third-speed synchronization (step S360 in FIG. 5).

According to an embodiment of the present invention, by controlling the hydraulic pressure control duty of the off-going friction element according to an input torque during a power-on 2-3 upshift and then completely releasing the hydraulic pressure from the off-going friction element at a point at which a current turbine rpm becomes lower than a second-speed synchronous turbine rpm by a predetermined value, a flare can be prevented, and thereby a reliable shift control can be realized.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control system of an automatic transmission, comprising:
 at least one sensor, including at least one of a transmission output shaft rpm sensor, a throttle opening angle sensor, an engine rpm sensor, and a turbine rpm sensor;

a hydraulic pressure control actuator for hydraulic pressure control of friction elements of the automatic transmission; and a transmission control unit controlling the hydraulic pressure control actuator to perform a gear shifting on the basis of signals from the at least one sensor, wherein the transmission control unit performs a duty control for controlling hydraulic pressures for an on-coming friction element and an off-going friction element during a power-on 2-3 upshift, such that hydraulic pressures for the on-coming friction element and the off-going friction element are simultaneously controlled based on a turbine torque;

and wherein the transmission control unit controls a hydraulic pressure control duty of the off-going friction element, and outputs the hydraulic pressure control duty of the off-going friction element as 0% at a point when a current turbine rpm is lower than a second gear synchronous turbine speed by a predetermined value, and at the same time gradually increases the hydraulic pressure control duty of the on-coming friction element to 100%.

2. The shift control system of claim 1, wherein the transmission control unit simultaneously controls the hydraulic pressure control duty of the off-going friction element and the on-coming friction element respectively using maps having hydraulic pressure duty values determined with respect to turbine torques.

3. A power-on 2-3 upshift control method for an automatic transmission, comprising:

determining whether a power-on 2-3 upshift condition exists;

extracting an initial hydraulic pressure control duty and hydraulic pressure control duty depending on an input torque from a map table for an on-coming friction element and an off-going friction element, if it is determined that the power-on 2-3 upshift condition exists, and performing a shift control for the upshift; and releasing hydraulic pressure of the off-going friction element at a point at which hydraulic pressure for the on-coming friction element is capable of tolerating a turbine torque, wherein the hydraulic pressure for the off-going friction element is completely released at a point when a turbine rpm becomes lower than a second gear synchronous turbine speed by a predetermined rpm.

4. The power-on 2-3 upshift control method of claim 3 further comprising:

completing a synchronization of a third gear by gradually increasing hydraulic pressure supplied to the on-coming friction element from a point when the hydraulic pressure for the off-going friction element is completely released.

5. The power-on 2-3 upshift control method of claim 3 wherein hydraulic pressure control duty for the off-going friction element is controlled to be a first value in a first control range where an upshift starts, is increased to a second value in a second control range, is decreased to a third value and is controlled to be decreased by a predetermined decreasing rate in a third control range, and is controlled to be zero after the third control range.

6. The method of claim 3, wherein said releasing step comprises completely releasing hydraulic pressure of the off-going friction element.

7. A power-on 2-3 upshift control method for an automatic transmission, comprising:

increasing hydraulic pressure control duty of an on-coming friction element to a duty of 100% at a point after elapsing a first predetermined time from a point of detecting that a power-on 2-3 upshift condition exists, simultaneously decreasing hydraulic pressure control duty of an off-going friction element to a first predetermined duty, and then maintaining the duty of 100% of the on-coming friction element and the duty of the first predetermined duty of the off-going friction element for a second predetermined time;

increasing the hydraulic pressure control duty of the off-going friction element to a second predetermined duty that is determined based on a turbine torque and a transmission output shaft rpm, at a point of an end of the second predetermined time, and then maintaining the second predetermined duty of the off-going friction element for a third predetermined time;

decreasing the hydraulic pressure control duty of the off-going friction element to a third predetermined duty, at a point of an end of the third predetermined time, and then decreasing the hydraulic pressure control duty of the off-going friction element by a first predetermined rate;

decreasing the hydraulic pressure control duty of the on-coming friction element to a fourth predetermined duty that is determined based on the turbine torque and the transmission output shaft rpm, at the point of the end of the second predetermined time, and then maintaining the fourth predetermined duty of the on-coming friction element for the third predetermined time and the fourth predetermined time;

decreasing the hydraulic pressure control duty of the off-going friction element to 0% at a point of an end of the fourth predetermined time, and then maintaining the hydraulic pressure control duty of the off-going friction element at 0%; and decreasing the hydraulic pressure control duty of the on-coming friction element to a fourth predetermined duty, and then gradually increasing the hydraulic pressure control duty of the on-coming friction element to 100%.

8. The power-on 2-3 upshift control method of claim 7, wherein the point of the end of the fourth predetermined time is a point when a turbine rpm becomes lower than a second gear synchronous turbine speed by a predetermined rpm.

* * * * *